(12) United States Patent
Reynolds (10) Patent No.: US 9,927,891 B2
(45) Date of Patent: Mar. 27, 2018

(54) SYSTEM AND METHOD FOR REDUCING TRANSMITTER POWER CONSUMPTION

(75) Inventor: Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 988 days.

(21) Appl. No.: 13/434,463

(22) Filed: Mar. 29, 2012

(65) Prior Publication Data

US 2013/0257745 A1 Oct. 3, 2013

(51) Int. Cl.
| | |
|---|---|
| G06F 3/041 | (2006.01) |
| G06F 3/044 | (2006.01) |
| G06F 3/01 | (2006.01) |
| G06F 1/32 | (2006.01) |

(52) U.S. Cl.
CPC ............ *G06F 3/041* (2013.01); *G06F 1/3262* (2013.01); *G06F 3/016* (2013.01); *G06F 3/044* (2013.01); *G06F 2203/04108* (2013.01)

(58) Field of Classification Search
CPC ....................................... G06F 3/041
USPC .......................................... 345/173
See application file for complete search history.

(56) References Cited

U.S. PATENT DOCUMENTS

| | | | |
|---|---|---|---|
| 2007/0074914 A1 | 4/2007 | Geaghan et al. | |
| 2007/0247443 A1 | 10/2007 | Philipp | |
| 2009/0284495 A1 | 11/2009 | Geaghan et al. | |
| 2010/0292945 A1 | 11/2010 | Reynolds et al. | |
| 2012/0043971 A1 | 2/2012 | Maharyta | |
| 2012/0169661 A1* | 7/2012 | Chan et al. ................... | 345/174 |
| 2013/0021066 A1* | 1/2013 | Chen ............................. | 327/108 |
| 2013/0027283 A1* | 1/2013 | Cristaudo et al. ............. | 345/87 |

FOREIGN PATENT DOCUMENTS

| | | |
|---|---|---|
| CN | 1437182 A | 8/2003 |
| CN | 1577433 A | 2/2005 |
| CN | 1637792 A | 7/2005 |
| JP | 2003271105 A | 9/2003 |
| JP | 2004069848 A | 3/2004 |
| JP | 2010204312 A | 9/2010 |
| JP | 2011013288 A | 1/2011 |
| WO | WO-98/28731 A2 | 7/1998 |

OTHER PUBLICATIONS

PCT international search report and written opinion of PCT/US2013/029694 dated Jun. 19, 2013.
Chinese Patent Application No. 201380016859.5 Office Action dated Jun. 22, 2016. English translation Consists of 8 pages.
Japanese Patent Application No. P2015-503232 Office Action dated Jan. 31, 2017. English translation Consists of 4 pages.

* cited by examiner

*Primary Examiner* — William Boddie
*Assistant Examiner* — Andrew Schnirel
(74) *Attorney, Agent, or Firm* — Patterson + Sheridan, LLP (57) ABSTRACT

Embodiments of the invention generally provide a method and system that is able to reduce the power consumption needed to drive sensor electrodes included within an input device. The power consumption of the input device is reduced by providing an intermediate electronic storage device that partially drives a sensor electrode before a driver module drives the sensor electrode the remaining amount to the second voltage potential.

18 Claims, 8 Drawing Sheets

SYSTEM AND METHOD FOR REDUCING TRANSMITTER POWER CONSUMPTION

FIELD OF INVENTION

Embodiments of the present invention generally relate to an input device, processing system, and method for reducing transmitter power consumption.

BACKGROUND

Touch sensor devices (also commonly called touch pads or touch screens) are widely used in a variety of electronic systems. A touch sensor device is typically a sensitive surface that uses capacitive, resistive, inductive, optical, acoustic or other technology to determine the presence, location and or motion of one or more fingers, styli, and/or other objects. The touch sensor device, together with a finger or other object provides an input to the electronic system. For example, touch sensor devices are used as input devices for computers, such as notebook computers.

In various embodiments, a touch sensor device typically includes an array of sensor electrodes configured to sense an input object in a sensing region of the device. To operate the sensor electrodes, each sensor electrode in the array is driven by driver circuitry, such as a buffer amplifier, that draws power from a power source. Driving the array of sensor electrodes in such a manner imposes a power consumption burden on the touch sensor device. Such a power consumption burden may be disadvantageous, especially when the touch sensor device is a device having a limited power supply. Further, the size of the driver circuitry is based on the amount of charge needed to drive the array of sensor electrodes, such that the larger the amount of charged needed the larger the size of the driver circuitry.

Therefore, there is a need for an improved input device, processing system, and method for a more efficient mechanism to drive sensor electrodes.

SUMMARY OF INVENTION

Embodiments of the present invention generally relate to an input device, processing system, and method for reducing transmitter power consumption. One embodiment of the invention generally provides a processing system for an input device. The processing system comprises a driver module comprising driver circuitry, the driver module coupled to a first transmitter electrode, the first transmitter electrode configured to emit a first transmitter signal when driven between a first voltage potential and a second voltage potential, wherein the driver module is configured to drive the first transmitter electrode from an intermediate voltage potential to the second voltage potential, wherein the intermediate voltage potential is between the first voltage potential and the second voltage potential, and wherein the first transmitter electrode is further coupled to an electronic storage device configured to drive the first transmitter electrode to the intermediate voltage potential. The processing system also comprises a receiver module coupled to a receiver electrode and configured to receive a resulting signal with the receiver electrode, wherein the resulting signal comprises effects corresponding to the first transmitter signal, and a determination module configured to determine positional information for an input object in a sensing region of the input device based on the resulting signal.

Another embodiment of the invention generally provides an input device. The input device comprises a plurality of transmitter electrodes comprising a first transmitter electrode configured to emit a first transmitter signal when driven between a first voltage potential and a second voltage potential, a plurality of receiver electrodes comprising a first receiver electrode, an electronic storage device coupled to the first transmitter electrode and configured to drive the first transmitter electrode to an intermediate voltage potential that is between the first voltage potential and a second voltage potential, and a processing system coupled to the first transmitter electrode and the first receiver electrode, the processing system configured drive the first transmitter electrode between the intermediate voltage potential and the second voltage potential, receive a resulting signal comprising effects corresponding to the first transmitter electrode signal with the first receiver electrode, and determine positional information for an input object in a sensing region of the input device based on the resulting signal.

Another embodiment of the invention generally provides a method for operating an input device. The method comprises transmitting a transmitter signal with a first transmitter electrode by driving the first transmitter electrode between a first voltage potential and a second voltage potential, wherein driving the first transmitter electrode between the first voltage potential and the second voltage potential comprises driving with an electronic storage device the first transmitter electrode to an intermediate voltage potential that is between the first voltage potential and a second voltage potential and driving with a driver the first transmitter electrode from the intermediate voltage potential to the second voltage potential, receiving a resulting signal comprising effects corresponding to the first transmitter electrode signal with a receiver electrode, and determining positional information for an input object in a sensing region of the input device based on the resulting signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention generally provide a method and system that is able to reduce the power consumption needed to drive sensor electrodes included within an input device. The power consumption of the input device is reduced by providing an intermediate electronic storage device that partially drives a sensor electrode before a driver module drives the sensor electrode the remaining amount to the second voltage potential.

Figure 1:
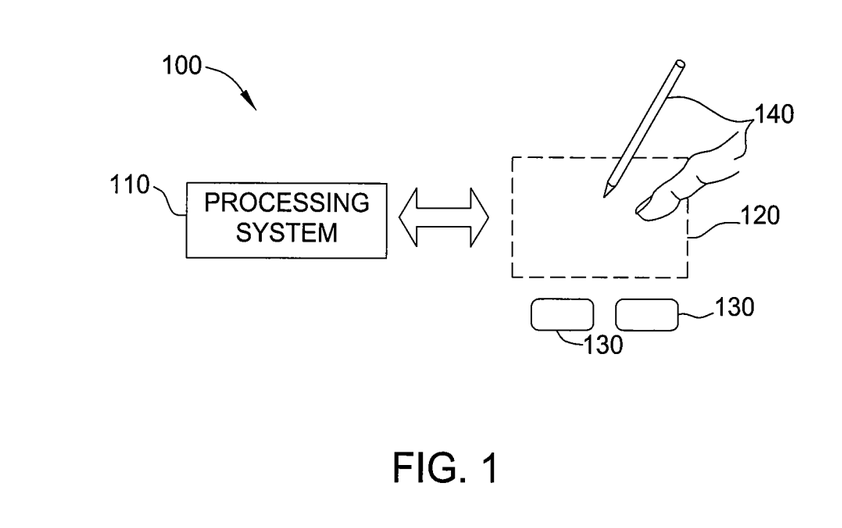
FIG. 1 is a schematic block diagram of an exemplary input device, in accordance with embodiments of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include parallel or serial communications, such as I2C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
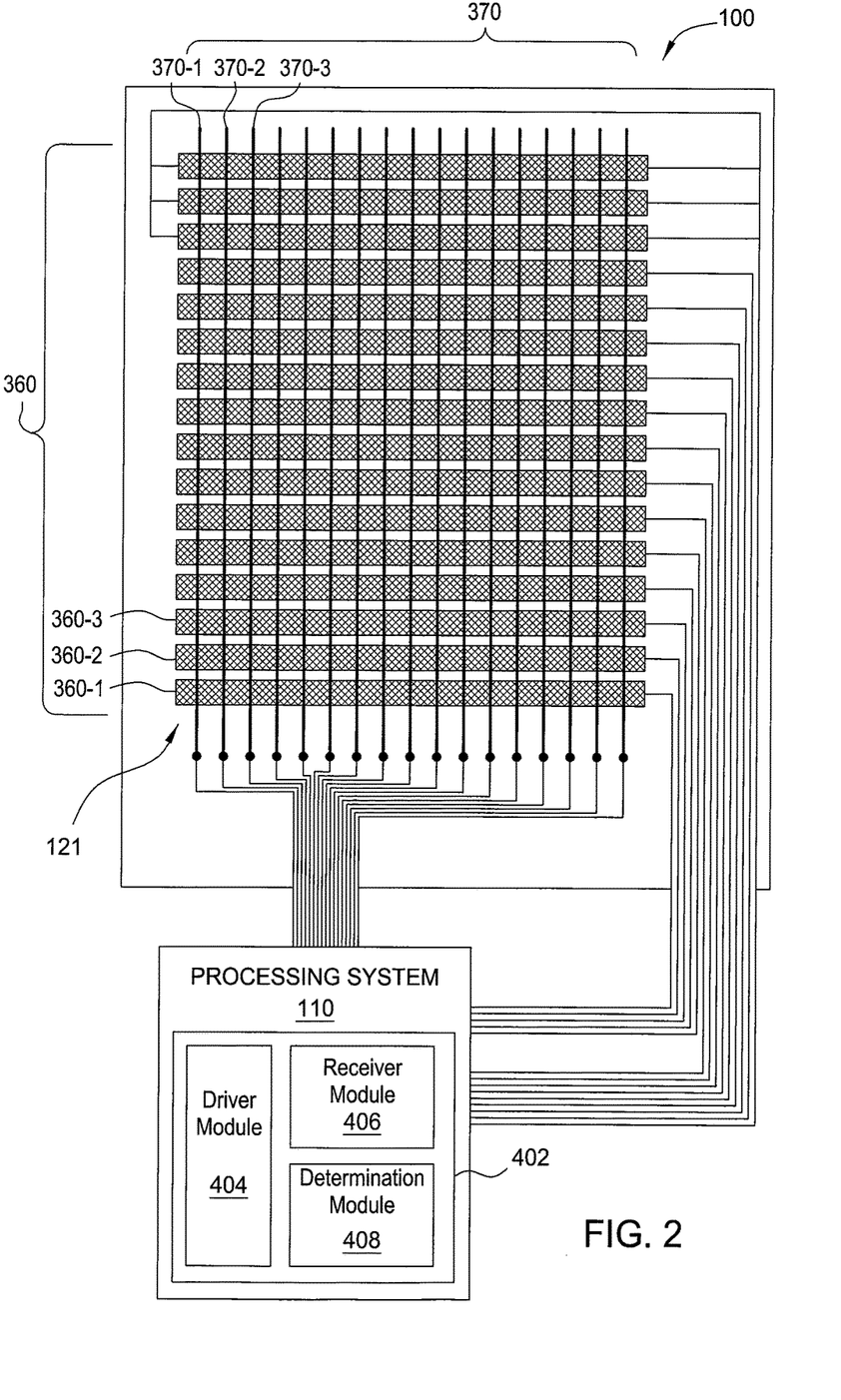
FIG. 2 is a schematic plan view illustrating one example of a sensor module coupled to a processing system, according to one or more of the embodiments described herein.

FIG. 2 is a schematic plan view of the input device 100 comprising a plurality of sensor electrodes (i.e., the transmitter electrodes 360 and receiver electrodes 370) coupled to the processing system 110. In FIG. 2, processing system 110 is coupled with the receiver electrodes 370 and configured to receive resulting signals from the receiver electrodes 370. Processing system 110 is also coupled with transmitter electrodes 360, and is also configured to operate transmitter electrodes 360 in a manner that enables sensing of an input object in the sensing region 120.

In the embodiment illustrated in FIG. 2, the sensing electrodes are disposed in a pattern of simple rectangles. In one embodiment, as shown, the sensing element pattern comprises a plurality of transmitter electrodes 360 (e.g., transmitter electrodes 360-1, 360-2, 360-3, etc.), and a plurality of receiver electrodes 370 (e.g., receiver electrodes 370-1, 370-2, 370-3, etc.) that are disposed above the plurality of transmitter electrodes 360. In various other embodiments, the plurality of transmitter electrodes 360 and the plurality of receiver electrodes 370 may be disposed on the same side of a substrate. Further, while the plurality of transmitter electrodes 360 and the plurality of receiver electrodes 370 are illustrated as rectangles, in other embodiments the sensor electrodes may have various other shapes and sizes. Further, in various embodiments the plurality of transmitter electrodes 360 and the plurality of receiver electrodes 370 may differ in at least one of size or shape. In yet other embodiments, the plurality of transmitter electrodes 360 and the plurality of receiver electrodes 370 may be of a similar size. In another embodiment, at least one transmitter electrode of the plurality of transmitter electrodes 360 is different in at least one of size and shape for at least a second transmitter electrode of the plurality of transmitter electrodes 360. In another embodiment, at least one receiver electrode of the plurality of receiver electrodes 370 is different in at least one of size and shape for at least a second receiver electrode of the plurality of receiver electrodes 360.

Transmitter electrodes 360 and receiver electrodes 370 are typically ohmically isolated from each other. That is, one or more insulators separate transmitter electrodes 360 and receiver electrodes 370 and prevent them from electrically shorting to each other. In some embodiments, transmitter electrodes 360 and receiver electrodes 370 are separated by electrically insulative material disposed between them at cross-over areas. In such configurations, the transmitter electrodes 360 and/or receiver electrodes 370 may be formed with jumpers connecting different portions of the same electrode. In some embodiments, transmitter electrodes 360 and receiver electrodes 370 are separated by one or more layers of electrically insulative material. In some other embodiments, transmitter electrodes 360 and receiver electrodes 370 are separated by one or more substrates, for example, they may be disposed on opposite sides of the same substrate (e.g., color filter glass), or on different substrates that are laminated together. In other embodiments, the transmitter electrodes 360 and receiver electrodes 370 are disposed in a single layer, such they are disposed on a similar side of a substrate.

The areas of localized capacitive coupling between transmitter electrodes 360 and receiver electrodes 370 may be termed "capacitive pixels." The capacitive coupling between the transmitter electrodes 360 and receiver electrodes 370 change with the proximity and motion of input objects 140 in the sensing region 120 associated with the transmitter electrodes 360 and receiver electrodes 370.

In some embodiments, the sensor pattern is "scanned" to determine these capacitive couplings. That is, the transmitter electrodes 360 are driven to transmit transmitter signals. Transmitter electrodes 360 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 370 to be independently determined. The receiver sensor electrodes 370 may be operated singly or multiply to acquire resulting signals. The resulting signals may be used by the processing system 110 to determine measurements of the capacitive couplings at the capacitive pixels, which are used to determine whether an input object is present and its positional information, as discussed above.

In some input device embodiments, the transmitter electrodes 360 and/or the receiver electrodes 370 are disposed on a substrate of the associated display screen. For example, the transmitter electrodes 360 and/or the receiver electrodes 370 may be disposed on a polarizer, a color filter substrate, or a glass sheet of an LCD. As a specific example, the transmitter electrodes 360 may be disposed on a TFT (Thin Film Transistor) substrate of an LCD, and may or may not also be used in display operations of the display screen. As another example, the receiver electrodes 370 may be disposed on a color filter substrate on an LCD glass sheet, on a protection material disposed over the LCD glass sheet, on a lens glass, and the like.

Processing system 110 comprises driver module 404, receiver module 406 and determination module 408. In one embodiment, processing system 110 is coupled to the transmitter electrodes 360 and the receiver electrodes 370.

Driver module 404 includes any combination of software and/or hardware (e.g., driver circuitry) configured to drive a transmitter electrode with one or more voltage potentials. Driver module 404 may be configured to operate the transmitter electrodes 360 in any appropriate manner, examples of which are described herein. For example, driver module 404 may be configured to drive transmitter electrodes, to transmit transmitter signals, to hold the transmitter electrodes to a reference voltage potential (e.g., to a V-com voltage potential, to system ground, etc.), or to hold the transmitter electrodes at high impedance. In some embodiments, the driver module 404 drives one or more transmitter electrodes 360 from a first voltage potential to a second voltage potential. In alternate embodiments, an additional voltage potential source drives a transmitter electrode 360 to an intermediate voltage potential that is between the first voltage potential of the transmitter electrode 360 and the second voltage potential. The driver module 404 then drives the transmitter electrode 360 from the intermediate voltage potential to the second voltage potential.

Receiver module 406 includes any combination of software and/or hardware configured to receive one or more resulting signals with receiver electrodes. In one embodiment, receiver module 406 is configured to receive the resulting signals with the receiver electrodes 370. In some configurations, the receiver module 406 is adapted to acquire and/or receive signals when no transmitter signal is transmitted with the plurality of transmitter electrodes 360, for the determination the amount of environmental interference.

Determination module 408 includes any combination of hardware and/or software configured to determine positional information for at least one input object in sensing region 120, based on the resulting signal(s) received by receiver module 406.

Figure 3:
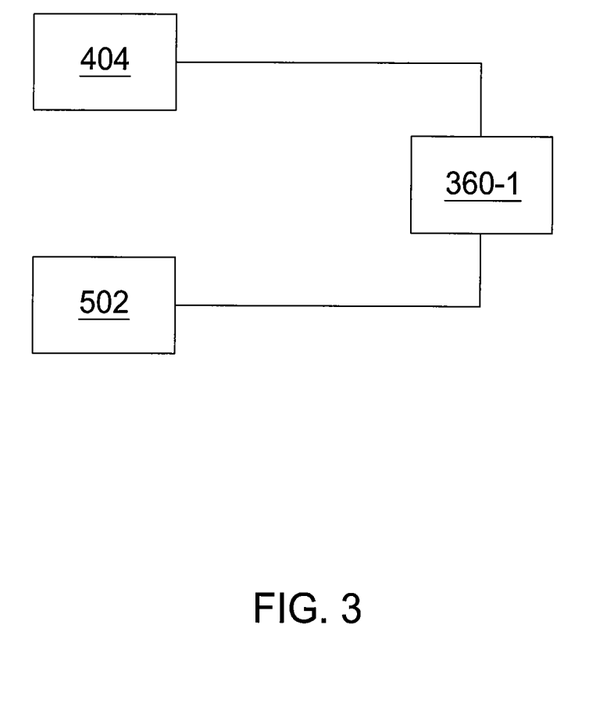
FIG. 3 is a schematic diagram illustrating a configuration of the driver module of FIG. 2, according to one or more embodiments described herein.

FIG. 3 illustrates a schematic diagram where the driver module 404 and electronic storage device 502 are coupled to one of the transmitter electrodes 360-1 according to one or more embodiments described herein. In one embodiment, the driver module 404 is coupled to a first transmitter electrode, and configured to drive the first transmitter electrode from an intermediate voltage potential to a second voltage potential. The driver module 404 may be further configured to drive the first transmitter electrode from the intermediate voltage potential to a first voltage potential. The electronic storage device 502 is coupled to the transmitter electrode and configured to drive the transmitter electrode to the intermediate voltage potential between the first voltage potential and the second voltage potential. In one embodiment the intermediate voltage may be system ground, V-Com, or a reference voltage of the input device 100.

Figure 4:
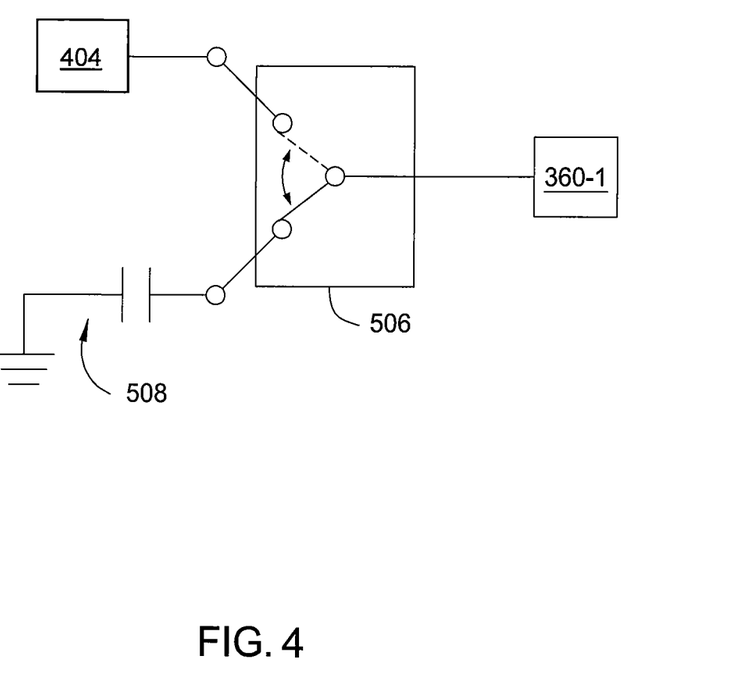
FIG. 4 is a schematic diagram illustrating a configuration of the driver module of FIG. 2, according to one or more embodiments described herein.

In the embodiment of FIG. 4, the electronic storage device 502 comprises capacitor 508 and the electronic storage device 502 and driver module 404 is selectively coupled to the transmitter electrode. In one embodiment, switching mechanism 506 is configured to selectively couple drive module 404 and capacitor 508 of electronic storage device 502 to the transmitter electrode.

In one embodiment, the driver module 404 comprises a regulator coupled to a voltage potential source. In an alternate embodiment, the driver module 404 comprises an amplifier or buffer (e.g., DAC controlled) coupled to a voltage potential source. In a further embodiment, driver module 404 comprises a power supply, a voltage boost, or inverter, and/or a buffer amplifier. Persons skilled in the art would recognize that the driver module 404 may comprise any other driver circuitry configured to drive the transmitter electrode 360-1. The capacitor 508 is configured to be charged to a pre-determined charge, for example, by the driver module 404 or other charge source. Further, the capacitor 508 is configured to drive the transmitter electrode 360 to an intermediate voltage potential that is between the first voltage potential of the transmitter electrode 360 and a second voltage potential. The switching mechanism 506 is configured to, in one state, couple the transmitter electrode 360-1 with the capacitor 508 and, in another state, couple the transmitter electrode 360-1 with the driver module 502. In one embodiment, the switching mechanism 506 comprises a plurality of switches. In another embodiment, switching mechanism comprises at least one transmitter.

In operation, when the transmitter electrode 360-1 is to be driven from a first voltage potential to a second voltage potential, the switching mechanism 506 first couples the transmitter electrode 360-1 with the capacitor 508. The capacitor 508 then discharges, driving the transmitter electrode 360 from a first voltage potential to an intermediate voltage potential that is between the first voltage potential 360 and the second voltage potential. Next, the switching mechanism 506 couples the transmitter electrode 360-1 with the driver module 404. The driver module 404 then drives the transmitter electrode 360-1 from the intermediate voltage potential to the second voltage potential. Beneficially, the driver module 404 need only drive the transmitter electrode 360-1 partially as the capacitor 508 drives the transmitter electrode 360-1 to the intermediate voltage potential. In such embodiments, power is saved across the input device 100 because the driver module 404 does not drive transmitter electrode 360-1 the entire way from the first voltage potential to the second voltage potential. In one embodiment, the voltage difference between the intermediate voltage potential and the first voltage potential is less than the voltage difference between the intermediate voltage potential and the second voltage potential. In another embodiment, the voltage difference between the intermediate voltage potential and the second voltage potential is less than the voltage difference between the intermediate voltage potential and the first voltage potential. In another embodiment, the voltage difference between the intermediate voltage potential and the second voltage potential is substantially the same as the voltage difference between the intermediate voltage potential and the first voltage potential.

The transmitter electrode 360-1 can be driven from a low voltage potential to a high voltage potential or from a high voltage potential to a low voltage potential. In the case where the transmitter electrode 360-1 is driven from the low voltage potential to the high voltage potential, the capacitor 508 discharges from a pre-determined charge when the transmitter electrode 360-1 is driven from the low voltage potential to the intermediate voltage potential. In the case where the transmitter electrode 360-1 is driven from the high voltage potential to the low voltage potential, the capacitor 508 is charged by the transmitter electrode 360-1 when the transmitter electrode 360-1 is driven from the high voltage potential to the intermediate voltage potential. The recovered charge on the capacitor 508 can then be used to drive the transmitter electrode 360-1 (or other transmitter electrode 360) back to the intermediate voltage potential from the low voltage potential, thus conserving the total amount of power utilized by the input device 100.

Figure 5:
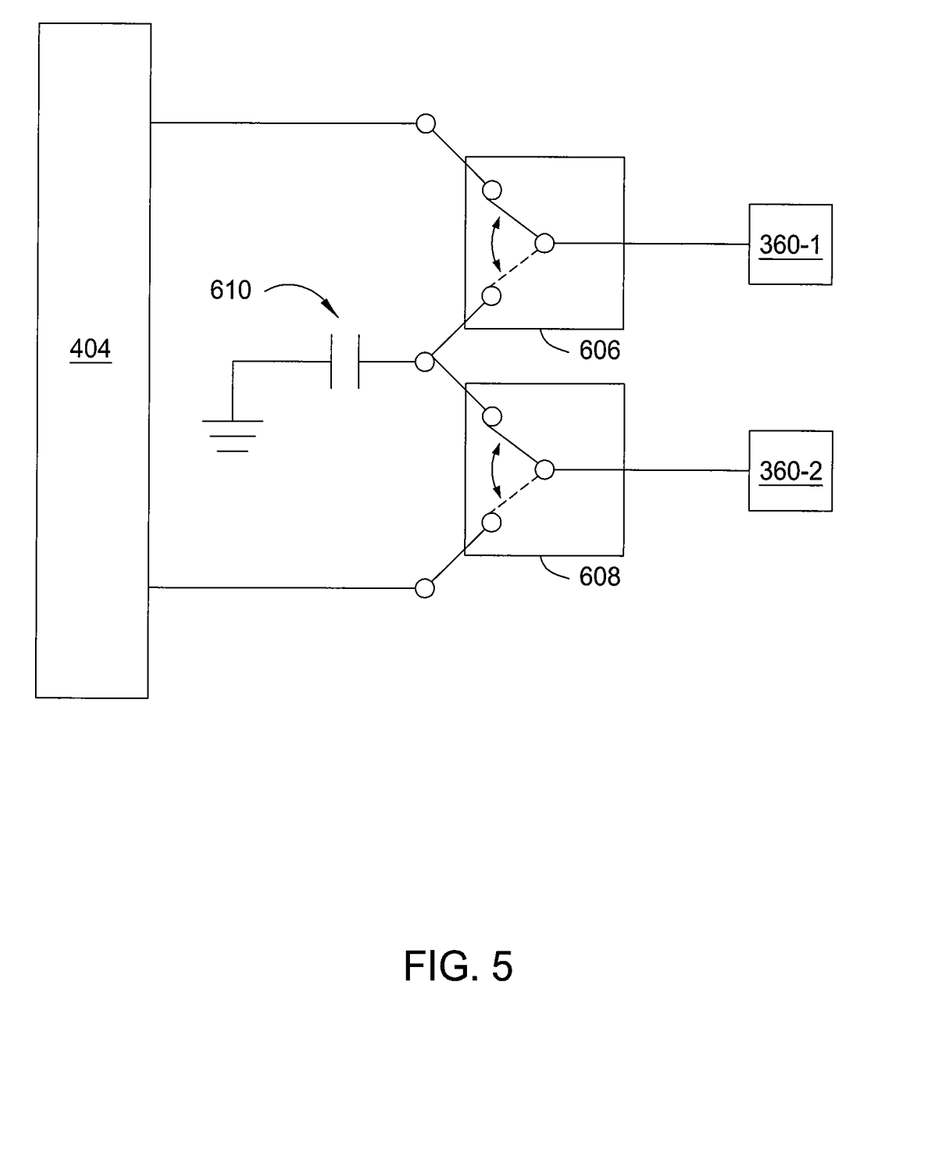
FIG. 5 is a schematic diagram illustrating a configuration of the driver module of FIG. 2, according to one or more embodiments described herein.

FIG. 5 is a schematic diagram illustrating another configuration of the processing system 110 coupled to transmitter electrodes 360-1, 360-2, according to one or more embodiments described herein. In an embodiment, the processing system 110 includes a driver module 404, a switching mechanism 606, a switching mechanism 608 and an electronic storage device 502 (e.g., capacitor 610).

The driver module 404 is configured to drive the transmitter electrode 360-1 and to drive the transmitter electrode 360-2. In one embodiment, the electronic storage device 502 comprises a capacitance 610 (e.g., a shared capacitor) which is configured to drive the first and second transmitter electrodes and to be charged to a pre-determined charge. In this embodiment, the capacitor 610 is configured to drive both the transmitter electrode 360-1 and the transmitter electrode 360-2 to an intermediate voltage potential. The processing system 110 may further comprise a switching mechanism 606 that is configured, in one state, to couple the transmitter electrode 360-1 with the capacitor 610 and, in another state, couple the transmitter electrode 360-1 with the driver module 404. The switching mechanism 608 also is configured, in one state, to couple the transmitter electrode 360-2 with the capacitor 610 and, in another state, couple the transmitter electrode 360-2 with the driver module 404.

In one embodiment, the transmitter electrode 360-1 and the transmitter electrode 360-2 are driven at the same time, where transmitter electrode 360-1 is driven from a high voltage potential to a low voltage potential and the transmitter electrode 360-2 is driven from a low voltage potential to a high voltage potential. In operation, the switching mechanism 606 couples the transmitter electrode 360-1 with the capacitor 610. Charge from the transmitter electrode 360-1 charges the capacitor 610 to an intermediate voltage potential, thus driving the transmitter electrode 360-1 from the high voltage potential to the intermediate voltage potential. The switching mechanism 606 then couples the transmitter electrode 360-1 to the driver module 404 which drives the transmitter electrode 360-1 from the intermediate voltage potential to the low voltage potential. The capacitor 610 is charged to drive the transmitter electrode 360-2. The switching mechanism 608 can couple the capacitor 610 the transmitter electrode 360-2 to drive the transmitter electrode 360-2 from the low voltage potential to the intermediate voltage potential at the same time. Once the transmitter electrode 360-2 is charged to the intermediate voltage potential, the switching mechanism 606 couples the transmitter electrode 360-2 with the driver module 404. The driver module 404 then drives the transmitter electrode 360-2 from the intermediate voltage potential to the high voltage potential. Again, the driver module 404 drives the transmitter electrode 360-1 and the transmitter electrode 360-2 partially as the capacitor 610 drives the transmitter electrode 360-1 and the transmitter electrode 360-2 to the intermediate voltage potential, thereby reducing the power consumption or the input device 100. In some embodiments, electronic storage device 502 can be used to transition a transmitter electrode to the intermediate voltage in only one direction (e.g., high to low or low to high).

The technique described above also may be implemented to drive more than two transmitter electrodes at the same time. For example, four transmitter electrodes may be driven at the same time, where two transmitter electrodes are driven from a low voltage potential to a high voltage potential and two transmitter electrodes are driven from a high voltage potential to a low voltage potential. Each transmitter electrode is first driven by a capacitor charged to an intermediate voltage potential and then driven by a driver module to the second voltage potential. In an embodiment, the capacitor can be a shared capacitor for multiple transmitter electrodes. Such an operation utilizes the same peak current for four transmitter electrodes which would typically be needed to directly drive two transmitter electrodes. As a result, up to half the power can be saved.

In addition, the technique described above may be implemented with an odd number of transmitter electrodes. In such an implementation, a relatively large capacitor (e.g., an external capacitor) and or a larger time period for transitioning transmitter electrodes (e.g., a frame) may be used, such that the voltage potential on the capacitor stays relatively constant.

Figure 6:
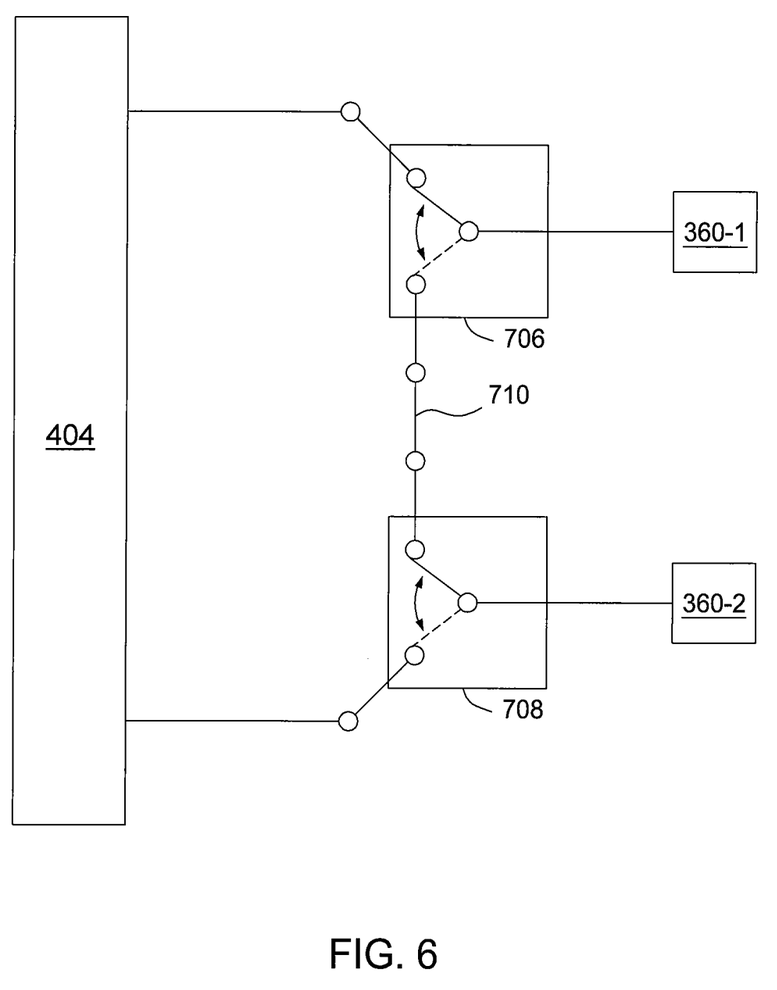
FIG. 6 is a schematic diagram illustrating a configuration of the driver module of FIG. 2, according to one or more embodiments described herein.

FIG. 6 is a schematic diagram illustrating yet another configuration of the driver module 404 coupled to transmitter electrodes 360-1, 360-2, according to one or more embodiments described herein. As shown, the processing system 110 includes driver module 404, a switching mechanism 706, a switching mechanism 708 and a shorting bar 710. In the embodiment, electronic storage device 502 comprises a transmitter electrode 360. In particular, the charge present in transmitter electrode 360-1 is discharged to transmitter electrode 360-2, or vice versa, such that the transmitter electrodes 360-1, 360-2 acquire an intermediate voltage potential that is between the high voltage potential and the low voltage potential previously present on the transmitter electrodes.

In operation, the switching mechanism 706 and the switching mechanism 708 simultaneously couple the transmitter electrode 360-1 and the transmitter electrode 360-2 to each other through the shorting bar 710. If the transmitter electrode 360-1 is charged to a high voltage potential, then a portion of the charge on the transmitter electrodes 360-1 flows to the transmitter electrode 360-2 through the shorting bar 710, causing the transmitter electrode 360-2 to be charged to the intermediate voltage potential. The switching mechanism 706 subsequently couples the driver module 404 to the transmitter electrode 360-1. The driver module 404 then drives the transmitter electrode 360-1 from the intermediate voltage potential to the low voltage potential. The switching mechanism 708 also couples the driver module 404 to the transmitter electrode 360-2. The driver module 404 then drives the transmitter electrode 360-2 from the intermediate voltage potential to the high voltage potential. Similarly, if the transmitter electrode 360-2 is charged to a high voltage potential, and the transmitter electrode 360-1 is charged to a low voltage potential a portion of the charge on the transmitter electrode 360-2 is transmitted to the transmitter electrode 360-1 using the shorting bar 710, causing the transmitter electrodes 360-1, 360-2 to be charged to the intermediate voltage potential. The switching mechanism 706 subsequently couples the driver module 404 to the transmitter electrode 360-1. The driver module 404 then drives the transmitter electrode 360-1 from the intermediate voltage potential to the high voltage potential. The switching mechanism 708 also couples the driver module 404 to the transmitter electrode 360-2. The driver module 404 then drives the transmitter electrode 360-2 from the intermediate voltage potential to the low voltage potential.

Figure 7:
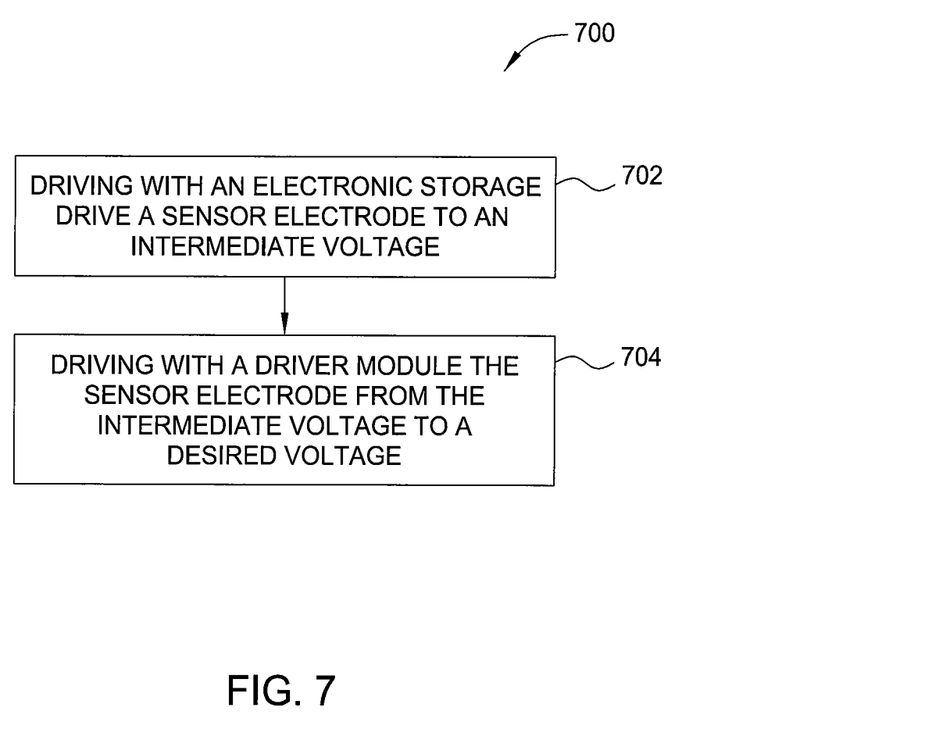
FIG. 7 is a flow diagram illustrating exemplary steps for driving a transmitter electrode to a second voltage potential, according to one embodiment of the invention.

FIG. 7 is a flow diagram illustrating an exemplary method 700 for driving a transmitter electrode to a designated voltage potential, according to one embodiment of the invention. Although the method steps are described in conjunction with the system of FIG. 1-6, persons skilled in the art will understand that any system configured to perform the method steps, in any order or with transmitter electrodes arranged in other configurations, is within the scope of the inventions.

The method 700 begins at step 702, where an electronic storage device drives a particular sensor electrode, such as the transmitter electrode 360-1, to an intermediate voltage potential. The intermediate voltage potential is a voltage potential that falls between a first voltage potential of the transmitter electrode and a second voltage potential of the transmitter electrode. The first voltage potential may be a low voltage potential or a high voltage potential. When the first voltage potential is a low voltage potential, the second voltage potential may be a relatively higher voltage potential. Similarly, when the first voltage potential is a high voltage potential, the second voltage potential may be a relatively lower voltage potential. In some embodiments, the electronic storage device is a capacitor. In alternate embodiments, the electronic storage device is another transmitter electrode, such as transmitter electrode 360-2. At step 704, a driver module drives the sensor electrode from the intermediate voltage potential to the second voltage potential.

Figure 8:
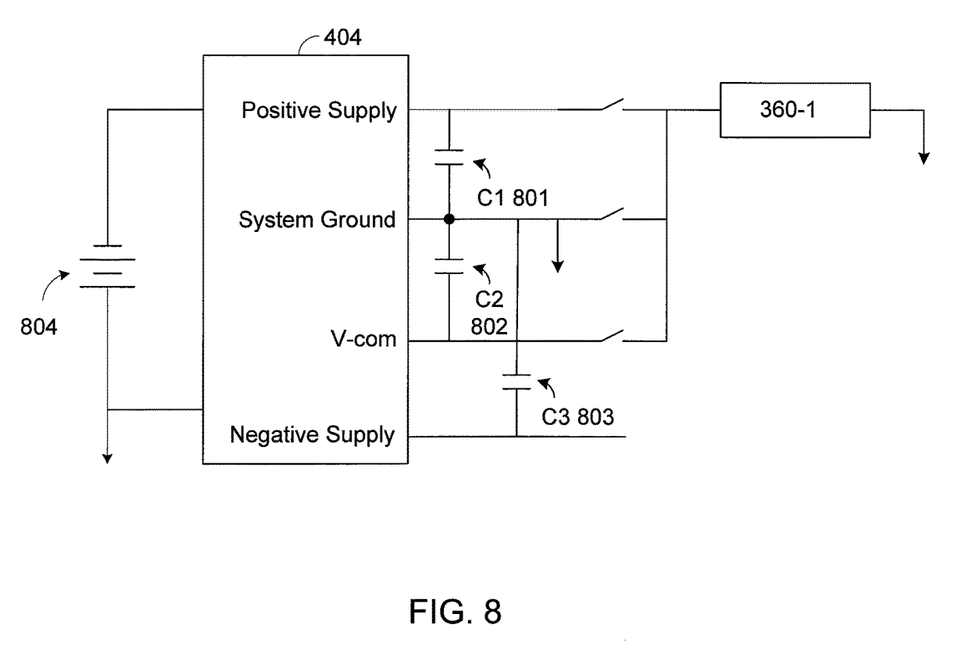
FIG. 8 is a schematic diagram illustrating a configuration of the driver module of FIG. 2, according to one embodiment of the invention.

FIG. 8 is a schematic diagram illustrating a configuration of the driver module 404 of FIG. 2, according to one embodiment of the invention. The driver module 404 may be used with a liquid crystal display (LCD). According to various embodiments, an electronic storage device 502 (e.g., capacitor C2 802) is coupled to the transmitter electrode 360-1 to drive the transmitter electrode 360-1 to an intermediate voltage potential that is between the first voltage potential and a second voltage potential. In one embodiment, the intermediate voltage is system ground. Furthermore, the first voltage is a V-com voltage of a common electrode in the display (e.g., −0.5V) and the second voltage is a positive power supply voltage (e.g., 5V).

In operation, the capacitances on system ground (e.g., C1, C2, C3) charge or discharge to drive the transmitter electrode 360-1 to the system ground voltage when system ground is coupled to the transmitter electrode 360-1. Driver module 404 drives the transmitter electrode 360-1 to the positive supply voltage. Thereafter, the transmitter electrode 360-1 is coupled to system ground, which drives the transmitter electrode 360-1 to system ground. Driver module 404 then drives the transmitter electrode 360-1 the rest of way to the V-com voltage.

In this way the driver module supplying V-com can supply less charge and consume less power from the power source 804 (e.g., battery). It is noted that charging and discharging capacitances on system ground does not consume power. However, power is consumed when driving the transmitter electrode 360-1 to the positive power supply voltage and to the V-com voltage. By using system ground to provide an intermediate voltage, the transmitter electrode 360-1 does not have to be driven as far using charge from power source 804. Accordingly, the power required to drive the transmitter electrode 360-1 is reduced.

Advantageously, using an electronic storage device to charge a transmitter electrode such that the driver module subsequently drives the transmitter electrodes results in power savings across the input device. Such power savings are extremely beneficial especially when the input device is powered by a limited power supply.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the foregoing is directed to embodiments of the present invention, other and further embodiments of the invention may be devised without departing from the basic scope thereof, and the scope thereof is determined by the claims that follow.

The invention claimed is:

1. A processing system for an input device, the processing system comprising:
   a driver module comprising driver circuitry and configured to couple with a first transmitter electrode that emits a first transmitter signal when driven between first and second voltage potentials, the second voltage potential being greater than the first voltage potential, the driver module configured to drive the first transmitter electrode to the second voltage potential from an intermediate voltage potential between the first and second voltage potentials;
   an electronic storage device configured to couple with the first transmitter electrode and to:
      drive the first transmitter electrode from the first voltage potential to the intermediate voltage potential, and
      drive the first transmitter electrode from the second voltage potential to the intermediate voltage potential;
   a receiver module configured to couple with a receiver electrode and to receive a resulting signal with the receiver electrode, the resulting signal comprising effects corresponding to the first transmitter signal; and
   a determination module configured to determine positional information for an input object in a sensing region of the input device based on the resulting signal.

2. The processing system of claim 1, wherein the processing system is configured to selectively couple the driver module and the electronic storage device to the first transmitter electrode.

3. The processing system of claim 1, wherein the intermediate voltage is substantially a system ground voltage.

4. The processing system of claim 1, wherein the electronic storage device comprises a capacitor.

5. The processing system of claim 4, wherein the capacitor is configured to be selectively coupled to a second transmitter electrode, wherein the second transmitter electrode is configured to emit a second transmitter signal when driven between the first voltage potential and the second voltage potential, wherein the receiver module is further configured to receive a second resulting signal comprising effects of the second transmitter signal with the receiver electrode, and wherein the determination module is further configured to determine positional information for the input object in the sensing region of the input device based on the second resulting signal.

6. The processing system of claim 5, wherein the capacitor is configured to drive the first transmitter electrode from the first voltage to the intermediate voltage and configured to drive the second transmitter electrode from the second voltage to the intermediate voltage.

7. The processing system of claim 1, wherein the electronic storage device comprises a second transmitter electrode that is configured to emit a second transmitter signal;

and wherein driving the first transmitter electrode to the intermediate voltage potential comprises coupling the first transmitter electrode with the second transmitter electrode.

8. An input device, comprising:
   a plurality of transmitter electrodes comprising a first transmitter electrode configured to emit a first transmitter signal when driven between a first voltage potential and a second voltage potential greater than the first voltage potential;
   a plurality of receiver electrodes comprising a first receiver electrode;
   an electronic storage device coupled to the first transmitter electrode and configured to:
      drive the first transmitter electrode from the first voltage potential to an intermediate voltage potential between the first voltage potential and the second voltage potential, and
      drive the first transmitter electrode from the second voltage potential to the intermediate voltage potential; and
   a processing system coupled to the first transmitter electrode and the first receiver electrode, the processing system configured to:
      drive the first transmitter electrode from the intermediate voltage potential to the second voltage potential,
      receive a resulting signal comprising effects corresponding to the first transmitter signal with the first receiver electrode, and
      determine positional information for an input object in a sensing region of the input device based on the resulting signal.

9. The input device of claim 8, further comprising a switching mechanism having a first state coupling the electronic storage device to the first transmitter electrode and having a second state coupling a driver module of the processing system to the first transmitter electrode.

10. The input device of claim 8, wherein the electronic storage device comprises a capacitor.

11. The input device of claim 10, wherein the capacitor is configured to be selectively coupled to a second transmitter electrode, wherein the second transmitter electrode is configured to emit a second transmitter signal when driven between the first voltage potential and the second voltage potential, wherein the processing system is further configured to:
   receive a second resulting signal comprising effects of the second transmitter signal with the first receiver electrode, and
   determine positional information for the input object in the sensing region of the input device based on the second resulting signal.

12. The input device of claim 11, wherein the capacitor is configured to drive the first transmitter electrode from the first voltage to the intermediate voltage and configured to drive the second transmitter electrode from the second voltage to the intermediate voltage.

13. The input device of claim 8, wherein the electronic storage device comprises a second transmitter electrode that is configured to emit a second transmitter signal; and wherein driving the first transmitter electrode to the intermediate voltage potential comprises coupling the first transmitter electrode with the second transmitter electrode.

14. The input device of claim 8, wherein the electronic storage device is further configured to drive a second transmitter electrode from the second voltage potential to the intermediate voltage potential.

15. The input device of claim 8, wherein driving the first transmitter electrode from the first voltage potential to an intermediate voltage potential that is higher than the first voltage potential and is between the first voltage potential and the second voltage potential comprises:
   driving the first transmitter electrode from the first voltage potential to the intermediate voltage potential when the electronic storage device is operating in a first mode, and
   driving the first transmitter electrode from the second voltage to the intermediate voltage potential when the electronic storage device is operating in a second mode.

16. A method for operating an input device, the method comprising:
   transmitting a first transmitter signal using a first transmitter electrode by driving the first transmitter electrode between a first voltage potential and a second voltage potential greater than the first voltage potential, wherein driving the first transmitter electrode between the first voltage potential and the second voltage potential comprises:
      driving with an electronic storage device the first transmitter electrode to an intermediate voltage potential between the first voltage potential and the second voltage potential,
      driving with the electronic storage device the first transmitter electrode from the second voltage potential to the intermediate voltage potential, and
      driving with driver circuitry the first transmitter electrode from the intermediate voltage potential to the second voltage potential;
   receiving with a receiver electrode a resulting signal comprising effects corresponding to the first transmitter signal; and
   determining positional information for an input object in a sensing region of the input device based on the resulting signal.

17. The method of claim 16, wherein the electronic storage device comprises a capacitor.

18. The method of claim 16, wherein the electronic storage device comprises a second transmitter electrode that is configured to emit a second transmitter signal; and wherein driving the first transmitter electrode to the intermediate voltage potential comprises coupling the first transmitter electrode with the second transmitter electrode.

* * * * *